Jan. 28, 1969
L. G. HORWITT
3,424,414
CIGAR LIGHTER RECEPTACLE
Filed Nov. 3, 1966
Sheet 1 of 2
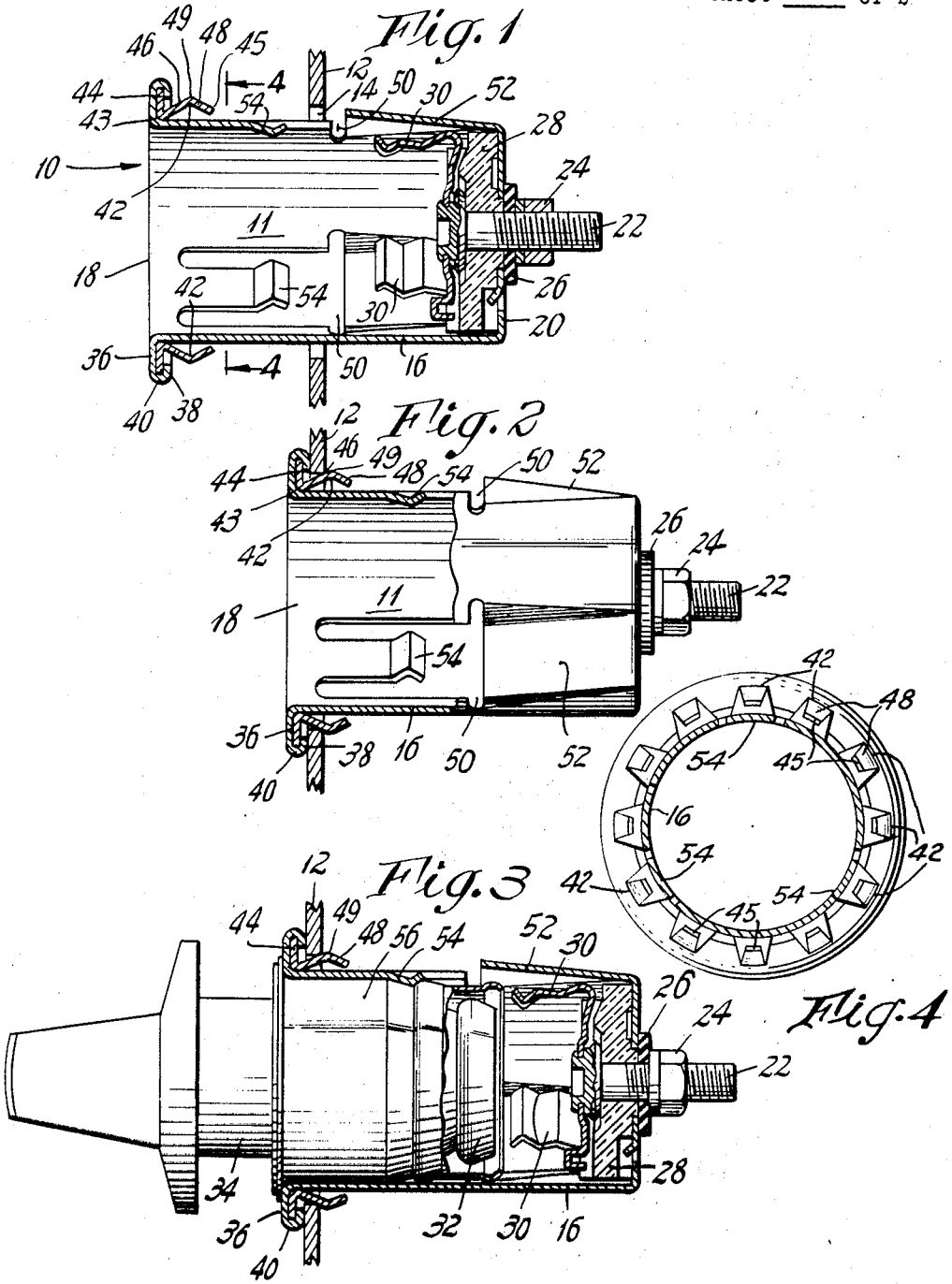
INVENTOR.
Laurence G. Horwitt
BY
Johnson and Kline
ATTORNEYS

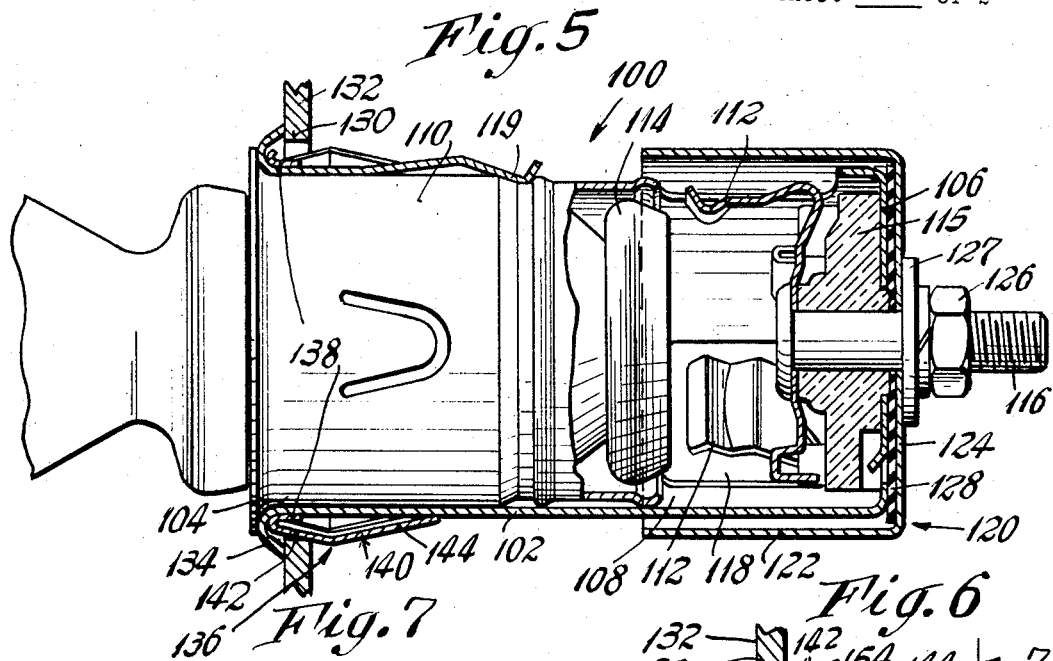
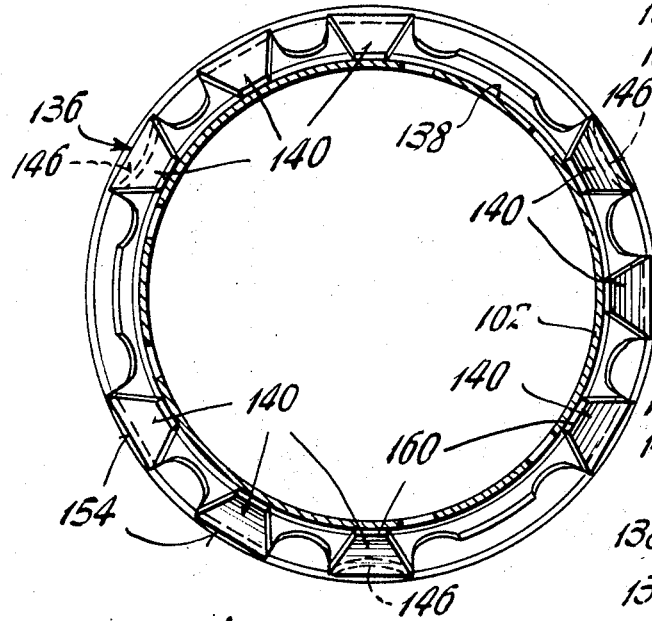
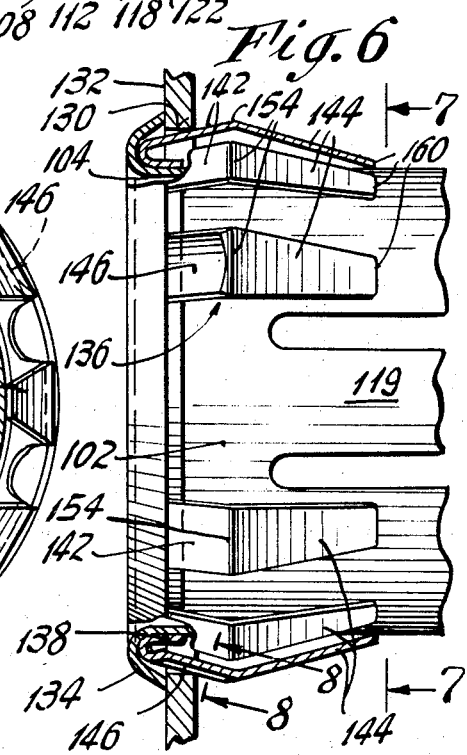
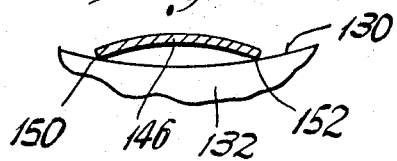
INVENTOR.
Laurence G. Horwitt

United States Patent Office 3,424,414
Patented Jan. 28, 1969

3,424,414
CIGAR LIGHTER RECEPTACLE
Laurence G. Horwitt, New Haven, Conn., assignor to Casco Products Corporation, Bridgeport, Conn., a corporation of Connecticut
Continuation-in-part of application Ser. No. 436,060, Mar. 1, 1965. This application Nov. 3, 1966, Ser. No. 600,322
U.S. Cl. 248—27          4 Claims
Int. Cl. G12b 9/02; F23q 7/22; H01r 13/46

ABSTRACT OF THE DISCLOSURE

A cigar lighter receptacle is provided with yieldable means so that it may be inserted in and removed from a hole in a supporting panel from the front of the panel, the yieldable means comprising an annulus having a succession of resilient detent fingers to releasably hold the receptacle in the hole against casual removal and being formed to present a cutting edge adapted to engage the inner edge of the panel hole and cut through an electrically insulating coating thereon.

---

This invention relates generally to electrically energized automobile cigar lighters, and more particularly to an improved mounting construction for the receptacles of such lighters which facilitates the mounting thereof from the outer face of various panels located in an automobile.

This application is a continuation-in-part of copending application, Ser. No. 436,060, filed Mar. 1, 1965, now abandoned.

A principal object of the present invention is to provide a cigar lighter receptacle suitable for use in automobiles which can be removably mounted in place upon any desired panel in the automobile and securely affixed thereon without the necessity of manual access to the inner or hidden face of the panel.

The mounting of the cigar lighter receptacles to the instrument panel, as well as the necessary electrical connections to the receptacle, is customarily made by manipulation of the receptacle parts within the working space behind the panel, provision for which must be made by the automobile manufacturer. Because of the vast array of equipment presently installed on and behind automobile instrument panels, as well as the various locations in the automobile where cigar lighters are now placed, it is highly desirable to connect the receptacle to the electrical system of the automobile and to mount the fully assembled receptacle onto a panel solely from the outer face thereof and without the necessity of manual working space behind the panel. It is also desirable from the point of view of service or repair to have the receptacle removably mounted on the panel, and to be removable therefrom by manipulation solely from in front of the panel.

Heretofore, cigar lighter receptacles which are mountable in the foregoing manner have either not been removable from the panel by virtue of being permanently locked in position by the mounting means, or they have not been securely mounted due to inherent weaknesses in the construction and arrangement of the mounting means which has customarily been an integral part of the well component of the receptacle.

These and other deficiencies and disadvantages of prior art constructions have been overcome to a surprising extent by the present invention, another principal object of which is to provide a cigar lighter receptacle having a yieldable retaining means mounted on the well adjacent the open front end thereof and being constructed and arranged to permit insertion of the receptacle in a panel aperture and withdrawal therefrom by substantially the same manipulations.

Another object of the present invention is to provide a cigar lighter receptacle in which the relative diameters of a well front end portion, a larger intermediate portion, a still larger stop means and the yieldable retaining means on the well front end portion are all selected in relation to the predetermined diameter of a panel aperture that the well passes freely through the aperture but is arrested by abutment of the stop means on the panel outer surface and retained in place by engagement of the retaining means in the panel aperture. It is another object of the present invention to provide a cigar lighter receptacle in which the yieldable retaining means surrounds the outer wall of the well in overlying relationship therewith so as to prevent inadvertent abnormal inward distortion of the yieldable retaining means.

It is another object of the present invention to provide a cigar lighter receptacle in which the yieldable retaining means extends completely through the panel aperture when receptacle is in place therein, thereby assuring a secure mounting of the receptacle.

It is another object of the present invention to provide a cigar lighter receptacle in which the retaining means comprises a plurality of resilient fingers which are part of a separate and distinct member from the well which is fabricated from a material which is less yieldable than that of the material of the well and more resilient so as to exert a substantially high holding force upon the panel.

Yet another object of the present invention is to provide a cigar lighter receptacle in which the yieldable mounting means includes means presenting a cutting edge for engagement with the panel aperture to cut through an electrically insulating coating which may be present, thereby assuring good electrical ground contact.

These and other objects and features of the present invention will be apparent from the following detailed description when considered in conjunction with the accompanying drawings in which:

FIGURE 1 is a side sectional view of one embodiment of a cigar lighter receptacle constructed in accordance with the present invention;

FIG. 2 is a side view partly in section showing the embodiment of FIG. 1 mounted in position on a panel;

FIG. 3 is a view similar to FIG. 2 showing an igniting unit in storage position in the receptacle;

FIG. 4 is a sectional view taken on the line 4—4 of FIG. 1;

FIG. 5 is a view similar to FIG. 3 illustrating a modified form of yieldable mounting means and a modified form of guard means for the receptacle;

FIG. 6 is a fragmentary view in elevation and to an enlarged scale of the open front end portion of the well with the igniting unit removed;

FIG. 7 is a sectional view taken on the line 7—7 of FIG. 6; and

FIG. 8 is a sectional view taken on the line 8—8 of FIG. 6.

Referring to FIGS. 1, 2, 3 and 4 of the drawings, the cigar lighter receptacle of one embodiment of the invention consists of an elongate substantially tubular shell 10 which defines a cavity 11 for receiving and removably holding a cigar lighter igniting unit, the shell 10 being adapted to be removably mounted on a panel 12 having an aperture 14 therethrough. The shell 10 comprises a substantially tubular wall 16 having a diameter smaller than the diameter of the panel aperture 14, and is open at its front end 18. A rear wall 20 substantially closes the rear end of the cavity 11 and supports the electrical contact and energizing structure for the igniting unit.

The igniting unit comprises a threaded conducting post 22 connected to the wall 20 by a threaded nut 24 and electrically insulated therefrom by a suitable washer 26 and a ceramic spacer 28. A plurality of bimetallic contact fingers 30 are electrically connected to the post 22 and are constructed and arranged to receive and hold the coil cup 32 (FIG. 3) of the igniting unit 34 when the latter is depressed to an energizing position, and to expand and release the igniting unit for ejection and withdrawal when the latter reaches its operating temperature, all in a manner well known in the art.

The forward end of the shell has stop means in the form of an outwardly extending radial flange 36 having a terminal portion 38 bent backwardly upon the flange 36 to form a re-entrant loop 40. The flange 36 has a diameter larger than the diameter of the aperture 14 in the panel 12 so as to limit rearward axial movement of the receptacle through the aperture 14.

The shell 10 is provided with a plurality of yieldable resilient lanced detent fingers 54 struck out of the tubular wall 16 to extend rearwardly from the forward end 18 thereof, the fingers serving to engage the outer wall 56 of the igniting unit 34 with sufficient frictional force to retain the latter in the receptacle when it is not in use.

In order to facilitate the connection of an electric wire (not shown) to the post 22 of the receptacle without the necessity of access to the space behind the panel 12, means are provided for retaining the shell on the panel 12 after the necessary electrical connections have been made from in front of the panel 12.

The retaining means is a member mounted on the shell 10 adjacent the forward open end 18 and secures the shell in position on the panel 12 in response to relative axial movement between the shell and the panel 12. The retaining means comprises a plurality of individually yieldable fingers 42 (see FIG. 4) which are attached at that forward ends 43 to an outwardly extending radial annulus 44 which is disposed in a plane normal to the axis of the shell and is captured in the loop portion 40 of the flange 36, the fingers 42 extending rearwardly to free ends 45. Each finger 42 is bent intermediate its ends to define a generally forwardly facing camming surface 46 and a generally rearwardly facing camming surface 48. The intermediate portion 49 at the aforementioned bends of the fingers 42 also has a diameter larger than the diameter of the aperture 14 of the panel 12.

As seen in FIGS. 1 and 2, when the receptacle is inserted through the aperture 14, the rear camming surface 48 of each finger 42 engages the outer marginal edge of the panel 12 surrounding aperture 14 and, upon contact therewith and continued rearward axial movement of the shell, the fingers 42 yield and bend radially inwardly until the outermost portion 49 of the fingers passes through the aperture, after which the fingers expand so as to forcibly contact the inner marginal edge of the panel 12 and thereby grip the panel between the forward camming surface 46 and the terminal portion 38 of the flange 36. Due to the resilience of the fingers 42 and their strong tendency to return to their normal unstressed position, the shell 10 is firmly held in the position illustrated in FIG. 2, from which it cannot be readily removed. It is however, by virtue of the camming surface 46, removable from the panel 12 by wedging a small tool between the panel 12 and the terminal portion 38 of the flange 36 and exerting sufficient outward or axial force on the shell 10 to again cause the fingers 42 to yield inwardly to permit them to pass through the aperture 14 for withdrawal of the receptacle from the panel aperture.

A significant aspect of the present invention lies in the construction and arrangement of the yieldable retaining means and its manner of mounting on the receptacle such that the yieldable retaining means surrounds the outer wall of the shell and is disposed in overlying relationship therewith. Thus the individual resilient fingers 42 are disposed in overlying adjacent relationship with the outer wall of the shell 10 throughout their length. Also, since the yieldable retaining means as a whole is a separate member mounted on the shell rather than being integrally formed therewith, and by virtue of the common mounting annulus 44 for the resilient fingers being adjacent the open front end of the shell 10 with the fingers extending rearwardly therefrom, the fingers 42 are disposed completely through the panel aperture when the shell 10 is fully inserted therein. The advantage of these features is that there is little if any possibility of the receptacle 10 becoming loose in the panel aperture over an extended period of use, since the resilient fingers 42 cannot possibly be inadvertently bent out of shape by any means in a direction which would decrease the effective diameter of the holding portion of the fingers to less than the diameter of the panel aperture 14. Any abnormal radially inward movement of the resilient fingers 42 is very effectively prevented by the outer surface of the shell 10, and the fact that the fingers 42 extend completely through the panel aperture further assures a secure engagement between the parts.

This construction and the attendant advantage is readily distinguishable from prior art cigar lighter receptacles mounting means in which the resilient retaining fingers are struck out from the wall and are not supported by any underlying structure and extend only part way through the panel aperture, such that the slightest distortion of the fingers inwardly beyond the elastic limit of the metal results in a loose mounting for the receptacle, and would permit the receptacle to be pulled out of the aperture when the igniting unit is grasped and pulled out for use.

It should be observed from FIG. 4 that the yieldable fingers 42 are disposed in relatively close spaced relation with each other, and extend completely around the periphery of the shell wall 16, a total of 12 fingers being shown for illustrative purposes, although this number may vary more or less depending upon the width of the fingers. Therefore, the fingers present a substantially continuous peripheral line of engagement with the panel adjacent the inner circumference of the aperture 14 to firmly secure the receptacle in position on the panel, the line of engagement being broken only by the relatively small spaces between each of the fingers 42.

By virtue of the retaining means being a separate and distinct member from the shell 10, it may be, and preferably is, formed of a material which is less yielding than the material from which the shell is formed. Thus the fingers 42 are relatively stiff and exert a substantially greater holding force upon the panel 12 than would be possible if they were formed of the same material as the shell, since the resilience of the shell fingers 54 must be such as to permit easy withdrawal of the igniting unit 34 when desired for use. Alternatively, the shell and retaining means may be formed of the same material but having different gauges to provide the relative difference in yieldingness therebetween.

An important problem solved by the present invention is that of removably mounting, from the front or exposed side of the mounting panel, a receptacle which is not of uniform diameter throughout its length, the present receptacle having an intermediate portion of larger diameter than that of the shell and which must also pass through the panel aperture. The intermediate portion is necessary for the reason that the receptacle is provided with a plurality of apertures 50 for the purpose of dissipating the heat necessary to actuate the bimetallic fingers 30 to release the igniting unit when the latter has reached its normal operating temperature. In order to prevent any electric wires or other objects from projecting into these apertures and causing a short circuit or other trouble, and also to prevent ignited particles of tobacco from dropping through the apertures 50 directly onto the floor of the automobile, the receptacle is provided with a guard means which, in this embodiment, comprises a plurality of bulges 52 formed in the wall 16 of the shell and which extends outwardly beyond the diameter of the tubular wall 16, but which nevertheless has a diameter smaller than that of the panel aperture 14, so that the entire shell passes freely through the aperture. The stop means 38 has a larger radius than the bulges 52.

It will now be appreciated, from the foregoing, that there is a specific relationship between the diameters of the several components of the shell and the predetermined diameter of the panel aperture 14, regardless of what that predetermined diameter may be. Thus, the receptacle of the present invention is adapted to be removably mounted in an aperture having a substantially fixed standard predetermined diameter, and with knowledge of that diameter, the shell front end portion has one diameter, the intermediate portion has a larger diameter in order to provide for the above-described guard means, and the stop means has a still larger diameter, these being selected in relation to the diameter of the panel aperture such that the receptacle is insertable rear end first through the panel aperture until the stop means abuts the outer surface of the panel. Therefore, the normal unstressed diameter of the yieldable retaining means at its outermost point 49 is at least larger than that of the guard means and is approximately equal to, or only very slightly smaller than, the diameter of the stop means so as to make firm holding contact with the inner marginal edge of the panel aperture.

Referring now to FIGS. 5, 6, 7 and 8, there is shown another embodiment of the invention having a modified form of guard means and a modified form of yieldable retaining means, although it will be understood that either form of guard means may be utilized with either form of retaining means.

In this embodiment, the receptacle 100 is substantially similar to that described above and comprises an elongate tubular shell 102 having an open front end portion 104 and a wall 106 closing the rear end of the shell 102, the shell defining a well 108 for receiving and removably holding an igniting unit 110. The receptacle 100 has the bimetallic contact fingers 112 for holding the coil cup 114 of the igniting unit 110 to energize the latter, the contact fingers 112 being secured to the ceramic spacer or insulating block 115 by means of the contact post 116 which projects from the rear end of the receptacle for connection to the electrical system of the automobile. The shell 102 is also provided with the necessary openings 118 for the purpose of dissipating heat as described above in connection with the previous embodiment. The receptacle 100 also has the lanced detent fingers 119 for removably holding the igniting unit 110.

The receptacle 100 is provided with guard means 120, again as for the purpose described above; however, the guard means 120 comprises a tubular sleeve 122 disposed in overlying concentric relationship with the shell 102 and having an apertured rear wall 124 through which the contact post 116 passes. A retaining nut 126 and washer 127 secures the guard means 120 to the receptacle 100. An insulating washer 128 is interposed between the wall 124 of the guard means and the rear wall 106 of the shell so as to insulate the guard means from the shell, the latter being grounded through the automobile frame.

Although the guard means 120 in this embodiment is a separate member from the shell, rather than being integral therewith as in the previous embodiment, it is nevertheless deemed to be an intermediate portion of the shell having a diameter larger than the diameter of the open front end portion 104 of the shell, substantially as definded above.

As with the previous embodiment, the receptacle 100 is adapted to be inserted rear end first into an aperture 130 formed in a panel 132 and be removably secured therein. Accordingly, the aperture 130 may have any desired substantially fixed, standard predetermined diameter, and the shell open front end portion 104 and intermediate portion 120 have diameters smaller than the predetermined diameter of the panel aperture 130. Rearward axial movement of the receptacle is arrested by a stop means 134 which, in this embodiment, is a radially outwardly projecting curved flange or bezel. The bezel 134 has a diameter larger than both the shell intermediate portion 120 and the panel aperture 130, so as to abut the outer surface of the panel 132 when the receptacle 100 is fully inserted in the aperture 130.

The receptacle 100 is secured in the panel aperture by yieldable retaining means 136, which comprises a separate member having a tubular annulus 138 which has an internal diameter substantially equal to the external diameter of the shell 102, so that the annulus 138 is received and retained on the shell with a press fit. A plurality of resilient bent fingers 140 are formed integrally with the annulus 138 and overlie the outer surface of the shell 102, the fingers 140 connecting with the forwardmost edge of the annulus 138 through a U-shaped portion, so that the resilient fingers each extend rearwardly of the receptacle 100 and project completely through the panel aperture 130.

Each resilient finger 140 is bent intermediate its ends to define generally forwardly and rearwardly facing camming surfaces 142 and 144, respectively, which function in the same manner as do the corresponding camming surfaces of the embodiment above described.

A significant feature of this embodiment of the invention is seen in FIGS. 6 and 8 and resides in the provision of a means for cutting through an electrically insulating coating, such as paint or the like, which may be deposited on the edges of the panel aperture before the receptacle is inserted therein. Thus, at least one, and preferably a plurality, of the resilient fingers 140 is provided with a radially outwardly facing concave depression 146 formed in the forwardly facing camming surface 142 of the one or more fingers 140, the depressions 146 thereby defining relatively sharp spaced cutting edges 150 and 152 disposed along the opposite sides of the forwardly facing camming portion 142. As seen in FIG. 8, when the receptacle is being inserted into the panel aperture 130, the terminal amount of axial movement of the receptacle, after the outermost portion 154 of the fingers passes the inner marginal edge of the panel aperture 130, causes the edges 150 and 152 to cut through paint or other coating on the edge and thereby assure a good electrical contact between the receptacle and the panel 132.

Another feature of this embodiment of the invention is that the resilient fingers 140 are bent in such a manner that they are normally biased to have the rearward free end 160 of each finger pressed firmly against the outer surface of the shell 102 to the extent that this end tends to dig into the metal of the shell wall if any relative rearward force is applied to the retaining means as a whole, thereby inhibiting such movement. Thus it will be seen that, by virtue of the press fit of the annulus 138 on the shell 102 and the firm biting contact between the rearward end 160 of the fingers 140 on the shell wall, a greatly simplified and less costly mounting of the yieldable retaining means on the shell is achieved.

It should be observed that the cigar lighter receptacle 100 of this embodiment has the same diametral dimensions relative to a predetermined panel aperture diameter as that of the previous embodiment. Thus, the shell front end portion 104 and larger intermediate portion 120 are both dimensioned to fit through the panel aperture, but the bezel 134 has a larger diameter than that of the panel aperture 130 so as to abut the outer surface of the panel 132. Also, the intermediate portion 154 of the resilient fingers 140 has an effective diameter approximately equal to, or very slightly smaller than, the diameter of the bezel 134, but at least larger than the shell intermediate portion 120 and larger than the panel aperture 130.

It will be seen from the foregoing that there is provided by this invention a cigar lighter receptacle having greatly improved mounting means for removably mounting the receptacle from the front or exposed side of the mounting panel, the receptacle of this invention having many significant advantages over front mounted prior art cigar lighter receptacles as pointed out hereinbefore.

It is to be understood that the embodiments above described and shown in the accompanying drawings are merely illustrative of the principles of the invention and are the best modes presently contemplated for carrying out those principles, and that variations and modifications of the embodiments disclosed may be made and portions of the invention may be used without others, without departing from the spirit and scope of the invention as defined in the appended claims.

I claim:
1. A cigar lighter receptacle for receiving and removably holding a cigar lighter igniting unit and adapted to be mounted on a panel having an aperture of predetermined diameter formed therein, said receptacle comprising an elongate tubular shell having an open front end portion and a closed rear end portion, stop means on said shell at its open front end portion to engage the exterior margin of the aperture in the panel to limit the inward movement of the igniting unit when the receptacle is inserted rear end first through the panel aperture, the diameter of the shell being less than the diameter of the panel aperture, and yieldable retaining means mounted on the open front end portion of the shell adjacent said stop means for substantially centering and removably holding the receptacle in the panel aperture, said yieldable retaining means comprising an annulus having an annular series of radially outwardly biased resilient bent fingers, each finger having end portions lying adjacent the outer surface of the shell and an intermediate portion projecting diametrically outwardly from the shell outer surface a distance greater than the diameter of the panel aperture whereby said fingers yield inwardly to permit insertion of the shell through the panel aperture and expand to engage the inner marginal edge of the panel aperture to secure the shell therein, the resilient bent fingers defining generally forwarding and rearwardly facing cam surfaces adapted to engage respectively the outer and inner marginal edges of the panel aperture, at least one of said fingers having means formed on the forwardly facing cam surface thereof for presenting a cutting edge adapted to engage the inner marginal edge of the panel aperture for cutting through an electrically insulating coating thereon.

2. A receptacle as set forth in claim 1 amended wherein the means presenting the cutting edge comprises a radially outwardly facing concave depression formed in the forwardly facing cam surface, said depression defining spaced sharp edges on opposite sides of said forwardly facing cam surface.

3. A cigar lighter receptacle for receiving and removably holding a cigar lighter igniting unit and adapted to be mounted on a panel having an aperture of predetermined diameter formed therein, said receptacle comprising an elongate tubular shell having an open front end portion and a closed rear end portion, stop means on said shell at its open front end portion, said stop means having a diameter larger than that of the panel aperture, the diameters of the shell and the stop means being selected, in relation to the predetermined diameter of the panel aperture, so that the receptacle is insertable rear end first through the panel aperture but is arrested and prevented from passing completely therethrough by said stop means, and yieldable retaining means comprising an annulus having an annular succession of resilient fingers mounted on the shell adjacent the open front end thereof, said resilient fingers being disposed on the outer surface of the shell and in overlying concentric relationship therewith whereby the shell outer surface prevents inadvertent radially inward distortion of said yieldable retaining means, said resilient fingers having an intermediate portion projecting diametrically outwardly to have a normal unstressed diameter approximately equal to the diameter of the stop means, and means defining generally forwardly and rearwardly facing cam surfaces disposed on either side of said intermediate portion for engaging respectively the inner and outer marginal edges of the panel aperture when the receptacle is being inserted in the panel aperture and when it is in place therein, at least one of the resilient fingers having means formed on the forwardly facing cam surface thereof for presenting a cutting edge adapted to engage the inner marginal edge of the panel aperture for cutting through an electrically insulating coating thereon.

4. A receptacle as set forth in claim 3 amended wherein the means presenting the cutting edge comprises a radially outwardly facing concave depression formed in the forwardly facing cam surface, said depression defining spaced sharp edges on opposite sides of said forwardly facing cam surface.

References Cited
UNITED STATES PATENTS

| | | | |
|---|---|---|---|
| 2,111,713 | 3/1938 | Watson. | |
| 2,113,535 | 4/1938 | Cuno et al. | 248—27 |
| 2,338,565 | 1/1944 | Ashton et al. | 219—267 |
| 2,640,672 | 6/1953 | Bedford | 248—27 XR |
| 2,700,751 | 1/1955 | Hallerberg | 339—128 XR |
| 2,858,409 | 10/1958 | Dening | 219—270 XR |
| 2,916,596 | 12/1959 | Krautwurst | 219—260 |
| 3,088,015 | 4/1963 | Cone et al. | 219—267 |

FRANCIS K. ZUGEL, Primary Examiner.

U.S. Cl. X.R.

219—267; 339—128